United States Patent [19]

LeMire et al.

[11] Patent Number: 4,504,387
[45] Date of Patent: Mar. 12, 1985

[54] SYSTEM AND METHOD FOR WATER PURIFICATION

[76] Inventors: George J. LeMire, 57 South St., Plainville, Mass. 02762; Charles F. Heinig, Jr., 665 Main Ave., Warwick, R.I. 02886; Edward A. LeMire, 159 Jordan Ave., Cranston, R.I. 02910

[21] Appl. No.: 547,128

[22] Filed: Oct. 31, 1983

[51] Int. Cl.³ ................ B01D 25/30; B01D 33/38
[52] U.S. Cl. ............................ 210/101; 210/206; 210/416.2; 422/29
[58] Field of Search ........... 210/749, 764, 765, 263, 210/284, 287, 501, 169, 101, 206, 416.2; 134/111, 101; 4/507, 510, 512; 422/22, 29, 176, 171, 115, 264, 278

[56] References Cited

U.S. PATENT DOCUMENTS

| | | | |
|---|---|---|---|
| 2,927,052 | 3/1960 | Moudry | 422/22 |
| 3,479,130 | 11/1969 | Rapaport | 422/1 |
| 3,615,244 | 10/1971 | Long | 422/264 |
| 4,108,775 | 8/1978 | Wilkes et al. | 210/169 |
| 4,396,512 | 10/1983 | Beauman et al. | 210/501 |

FOREIGN PATENT DOCUMENTS 0070638  6/1979  Japan .................................. 210/169

Primary Examiner—Richard V. Fisher
Assistant Examiner—Sharon T. Cohen
Attorney, Agent, or Firm—Robert J. Doherty

[57] ABSTRACT

A water purification system for use with a pool or the like in which a small quantity of water can be continually withdrawn from the pool for recycling. The system involves the use of silver impregnated activated charcoal granules as a combination filter and antimicrobial agent such that the need for chlorine and other conventional chemical treatment of the pool is eliminated or vastly diminished. A small portion of the water being recycled is diverted and so treated with the silver impregnated activated charcoal such that small amounts of silver ions are released into the water such that the silver concentration in the pool is maintained at a level effective to kill essentially all bacteria present therein.

3 Claims, 2 Drawing Figures

SYSTEM AND METHOD FOR WATER PURIFICATION

BACKGROUND AND OBJECTS OF THE INVENTION

This invention relates to a water purification system and more particularly to a system and its unique operational method in which silver ions are used to kill and prevent the growth of germs and bacteria in swimming pools and the like.

The continued popularity of swimming pools both public and private as well as the introduction of soaking or hot tubs has increased the need for the provision of a germ-free state in such environments. Presently, it is customary to treat swimming pools with chlorine in order to kill the bacteria and germs present therein. Such method is not only time consuming and expensive but also leads to discomfort to the users of the pool especially when the levels of chlorine present therein are accidentally or purposefully permitted to reach relatively high levels. It is also customary to use algaecides to eliminate or reduce the growth of plant life in the pool so as to not only improve the appearance or clarity of the water but also reduce any slipperyness caused thereby that might adversely affect the swimmer's safety.

A further attendant drawback of the use of chlorine compounds in swimming pools and the like is that when they chemically break down, they form hydrochloric acid which can undesirably lower the Ph level of the swimming pool. This can be neutralized by the use of basic salt compounds such as sodium bicarbonate but this again not only requires the measurement of the pool's Ph but also the measurement and calculation of the amount of basic salt compound necessary to complete the neutralization effect. Both these tasks are not only time consuming and expensive but can lead to errors especially when such is performed by those lacking in either the necessary skill or motivation.

The growing popularity of soaking or hot tubs has also introduced an additional or at least enhanced level of concern regarding disease communication between those using the facilities due to the smaller amount of water used, the higher level of heat commonly associated with such devices, and the more intimate proximity of those using such. In addition, the use of chlorine is not an effective disease or germ controlling agent when used in water heated over about 85° F.

Accordingly, it would be highly desirable to eliminate or at least drastically reduce the need for chlorination of pools, hot tubs, and the like along with the attendant time, cost, and undesirable side effects thereof. These and other objects of the present invention are accomplished by the use of a water purification system in which silver impregnated activated charcoal granules are utilized to treat a portion of water diverted from the recycling system such as a pool or hot tub and the like, such that the silver ion content of the main body of water is maintained at a level effective to kill essentially all germs and bacteria. This eliminates the need for chlorinazation in that neither germs or algae and the like can be supported in the body of water. In addition, such highly desirable results are not dependent upon minimazation of the water temperature of the pool or other body of water.

Other objects, features and advantages of the invention shall become apparent as the description thereof proceeds when considered in connection the the accompanying illustrative drawing.

DESCRIPTION OF THE DRAWING

In the drawing which illustrates the best mode presently contemplated for carrying out the present invention.

DESCRIPTION OF THE INVENTION

Figures 1, 2:
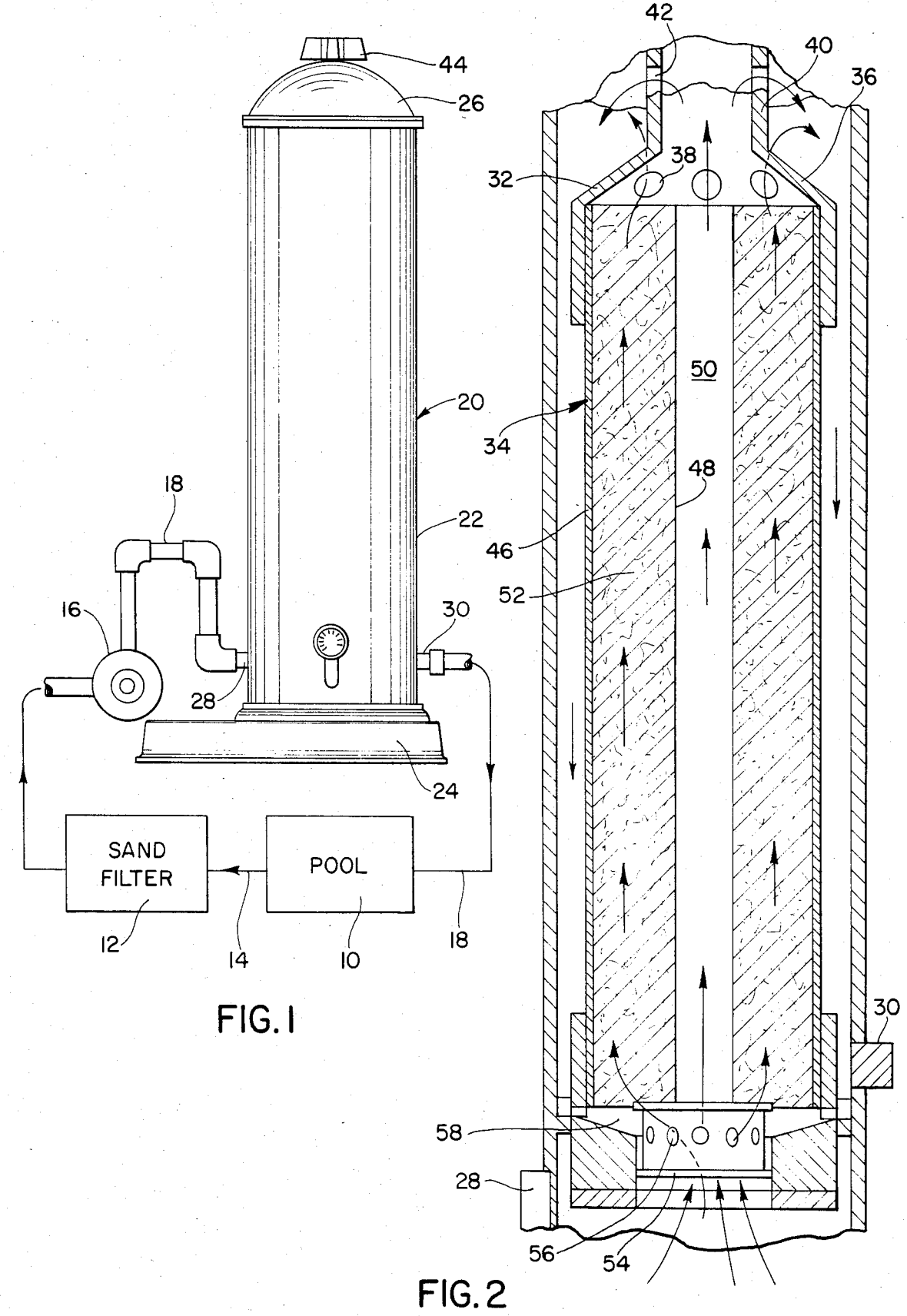
FIG. 1 is a somewhat schematic elevational view showing the overall system of the present invention.
FIG. 2 is a side sectional view taken along the line 2—2 of FIG. 1 and shows in particular the preferred canister construction format which in part permits the desired end results of the invention.

Referring now to the drawing and in particular to FIG. 1 thereof, the overall environment in which the present invention is utilized is shown. Therein a swimming pool 10 which may be a conventional pool either outdoor, indoor, public, or private or a hot tub, soaking tub, and the like is referred to by reference numeral 10. The term swimming pool or pool as used herein thus includes the above-indicated structures. A conventional sand filter 12, that is, a bed of sand through which water withdrawn from the pool by a recycling system 14 is passed may be utilized prior to or after treating the withdrawn or recycled water in the manner contemplated by the present invention. Such recycling system 14 includes a pump 16 and suitable piping 18 depicted by the piping representation or by the arrowed lines in FIG. 1. A predetermined amount of water is continually withdrawn from the pool at least during the operation of the pump, that water passed through the sand filter if such is to be utilized and thence to the treatment device 20 of the present invention after which it is returned to the pool via the conventional recycling system 14.

The device 20 of the present invention in its preferred form includes an outer casing 22 positioned on a stand 24 for upright positioning or otherwise conveniently mounted for coupling with the recycling system 14. Casing 22 is hollow and provided with a closed top 26 which may preferably be transparent or transluscent such that the movement of water through the casing 22 may be readily observed. The casing 22 is normally formed from some engineering plastic material such as reinforced fiberglass and is provided with an inlet 28 and outlet 30.

The upper part of the casing 22 is provided with a circular flange 32 adapted to receive the upper end of a canister 34. The flange 32 includes inwardly tapered shoulders 36 in turn provided with openings 38 as well as an upwardly extending hollow turret portion 40. The turret also includes side openings 42. In addition, the upper end of the turret (not shown) is adapted to abut against the dome-shaped top 26 which in turn is provided with a central opening through which a rod (not shown) and having an upper threaded end is adapted to be connected with a lock nut 44 positioned on top of the domed cap 26. The bottom of the rod may be provided with a flange or other conventional mechanism to engage the bottom of the canister 34 or part of the casing 22 which in turn bears against the canister to insure that the replaceable canister is firmly positioned within the casing. Other conventional means for holding the canister in its proper place may be utilized.

The canister 34 includes an outer shell 46 and an inner shell 48 each spaced from each other and constructed such that an internal longitudinal extending bore 50 is formed in the interior of the canister as well as a cylindrical chamber 52 positioned between the two shelves 48. The chamber 52 is adapted to receive silver impregnated activated charcoal granules. Such material may be formed by impregnating a support such as activated charcoal with the acidified chloride salt of the biologically active diammine silver ion. This salt is sometimes referred to as silver ammonia chloride. For example, a 2.08 grams of activated charcoal may be added to a mixture containing 0.03 gram of silver chloride, 20 milliliters of 5% ammonia, and 20 milliliters of 2% hydrochloric acid. The silver diammine coated activated charcoal precipitate mixture which forms during five minutes of stirring is washed, followed by drying at 212° F. to produce a filter medium with excellent disinfecting properties to water. As an alternative to activated charcoal, a ziolite or silica gel may be used as the support.

A water diverting collar 50 is positioned in the base of the casing 22 and is adapted to force a portion of water entering the inlet 28 out through openings 56 provided in the wall thereof into an intermediate chamber 58 and then upwardly through the chamber 52. It has been found that by diverting approximately 10 to 20 percent of the cycyled water from the inlet 28 in this fashion produces a desirable result. The remainder of the water passes through the chamber 50 and is essentially untreated. It should be realized that the untreated water passing through the chamber 50 essentially moves through the openings 42 in the turret 40 and thence downwardly through the space between the outside of the canister 34 and the inside of the casing 22 to the outlet 30. During its travel in such space, it is mixed with both the filtered and treated water from chamber 52. The diverted water passing through chamber 52 biologically active silver ions through its travel over the granules. The thus treated and filtered water additionally mixes with the remainder of the recycled water through piping 18 and is returned to the pool 10. The action is such that small amounts of silver ions are released into the water at a rate where the silver concentration in the pool is at an effective level to exhibit a marked antimicrobial effect on the water to the extent that it eliminates the need for chlorine and algaecide leaving only occasional Ph adjustments necessary to the pool, hot tub, and the like. It is desirable that the silver concentration of the pool not exceed about 50 ppb (parts per billion).

EXAMPLE 1

Charcoal granules impregnated with silver ions at a concentration of about 50 ppb were utilized in the canister described above. A home swimming pool with approximately 27,000 gals. of untreated water was utilized with the above described equipment. A flow rate at the pump of about 50 gals. per min. was utilized running continuously from 7 AM to noon each day, that is, for 5 hours a day. No other treatment was utilized and the pool received normal use for some swimming each day.

At the end of 20 days, the silver concentration in the pool was about 25 ppb and there were no measurable live virus.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A water purification system for effectively eliminating bacteria in the water of a swimming pool including a water recycling system including a pump wherein a quantity of water from said pool is continually withdrawn and returned thereto via suitable water conduits, comprising a canister having a hollow body including water inlet and outlet means provided thereon, said body in part forming first and second separate water channels therein, said first channel permitting water to move in an essentially unrestricted flow from said inlet to said outlet, said second channel having silver ion treated granules provided therein whereby water passing through said second channel is filtered by said granules and treated by said silver ions, said body being an elongated tube, a hollow elongated double-walled shell having upper and lower ends in a central interior opening adapted for disposition in said tube with the outer shell wall spaced from the tube inner surface, means defining said central interior opening in said shell forming said first channel and means defining an area between said shell walls forming said second channel, and means defining the space between the outer shell and said tube forming a mixing chamber for admixing said filtered and treated water passing through said second channel with the untreated water passing through said first channel prior to exiting said canister via said outlet means, said inlet means adapted to direct incoming water into the lower end of said shell such that said water enters and its flow proportioned into both of said channels, means connecting both said channels with said mixing chamber at the upper end of said shell, said connecting means including means defining first openings whereby said untreated water passes into said mixing chamber and means defining separate second openings whereby said treated water passes into said mixing chamber, said first openings disposed above said second openings and said outlet means connected to said mixing chamber below both said first and second openings.

2. The system of claim 1, said connecting means including a flange adapted to receive the upper end of the shell, said flange including inwardly tapered shoulders in turn provided with said second openings as well as an upwardly extending hollow turret portion in turn provided with said first openings.

3. The system of claim 1, said inlet means includes means directing approximately 10 to 20 percent of the incoming water through said second channel and the remainder of said water through said first channel.

* * * * *